United States Patent [19]
Wagner

[11] Patent Number: 5,303,133
[45] Date of Patent: Apr. 12, 1994

[54] MINIATURE ELECTRICAL LIGHTING DEVICE

[76] Inventor: Harry R. Wagner, 30026 Terrace Court Dr., Warren, Mich. 48093

[21] Appl. No.: 919,050

[22] Filed: Jul. 23, 1992

[51] Int. Cl.⁵ ............................................. F21L 7/00
[52] U.S. Cl. ................................. 362/157; 362/191; 362/206
[58] Field of Search ............... 362/157, 205, 206, 190, 362/191, 396, 800

[56] References Cited

U.S. PATENT DOCUMENTS

| | | | |
|---|---|---|---|
| 1,607,647 | 11/1926 | Seikot | 362/206 |
| 2,252,395 | 8/1941 | Cohen . | |
| 2,381,520 | 8/1945 | Saunders | 362/206 |
| 3,506,956 | 4/1970 | Kolm et al. . | |
| 4,281,368 | 7/1981 | Humbert | 362/260 |
| 4,376,349 | 3/1983 | Yargzower . | |
| 4,417,299 | 11/1983 | Rupp | 362/206 |
| 4,479,321 | 10/1984 | Welstead . | |
| 4,505,063 | 3/1985 | Price et al. . | |
| 4,586,284 | 5/1986 | Westwood, III . | |
| 4,603,333 | 7/1986 | Carlson . | |
| 4,697,374 | 10/1987 | Simms . | |
| 4,755,791 | 7/1988 | Kuroda . | |
| 4,823,496 | 4/1989 | Powell . | |
| 5,008,784 | 4/1991 | Wang | 362/206 |
| 5,161,879 | 11/1992 | McDermott | 362/206 |

FOREIGN PATENT DOCUMENTS

| | | | |
|---|---|---|---|
| 837417 | 3/1952 | Fed. Rep. of Germany | 362/206 |
| 804085 | 7/1936 | France | 362/206 |
| 397758 | 8/1935 | United Kingdom | 362/206 |

*Primary Examiner*—Richard R. Cole
*Attorney, Agent, or Firm*—Peter D. Keefe

[57] ABSTRACT

A compact, durable, lightweight and long lasting electrical lighting device which is economical to manufacture and able to be releasably attached to various objects, particularly thinly cross-sectioned members, without unduly burdening the object by its being connected thereto, is composed of a plastic cylindrical housing, a first endcap connected to one end of the housing, a light emitting member mounted to the first endcap, one or more batteries located within the housing for powering the light emitting member, a second endcap slidably connected with the other end of the housing so as to be rotatably and axially guided by slots on the surface of the housing adjacent thereto, a spring for biasing the second endcap away from the light emitting member so as to effect an open circuit between the light emitting member and the batteries, electrical leads and contacts for selectively effecting a closed circuit between the batteries and the light emitting member when the second end cap, serving as an electrical switch, is slid axially along the slots toward the light emitting member, and finally, an attachment member for releasably mounting the electrical lighting device to another object, such as a fishing pole.

9 Claims, 2 Drawing Sheets

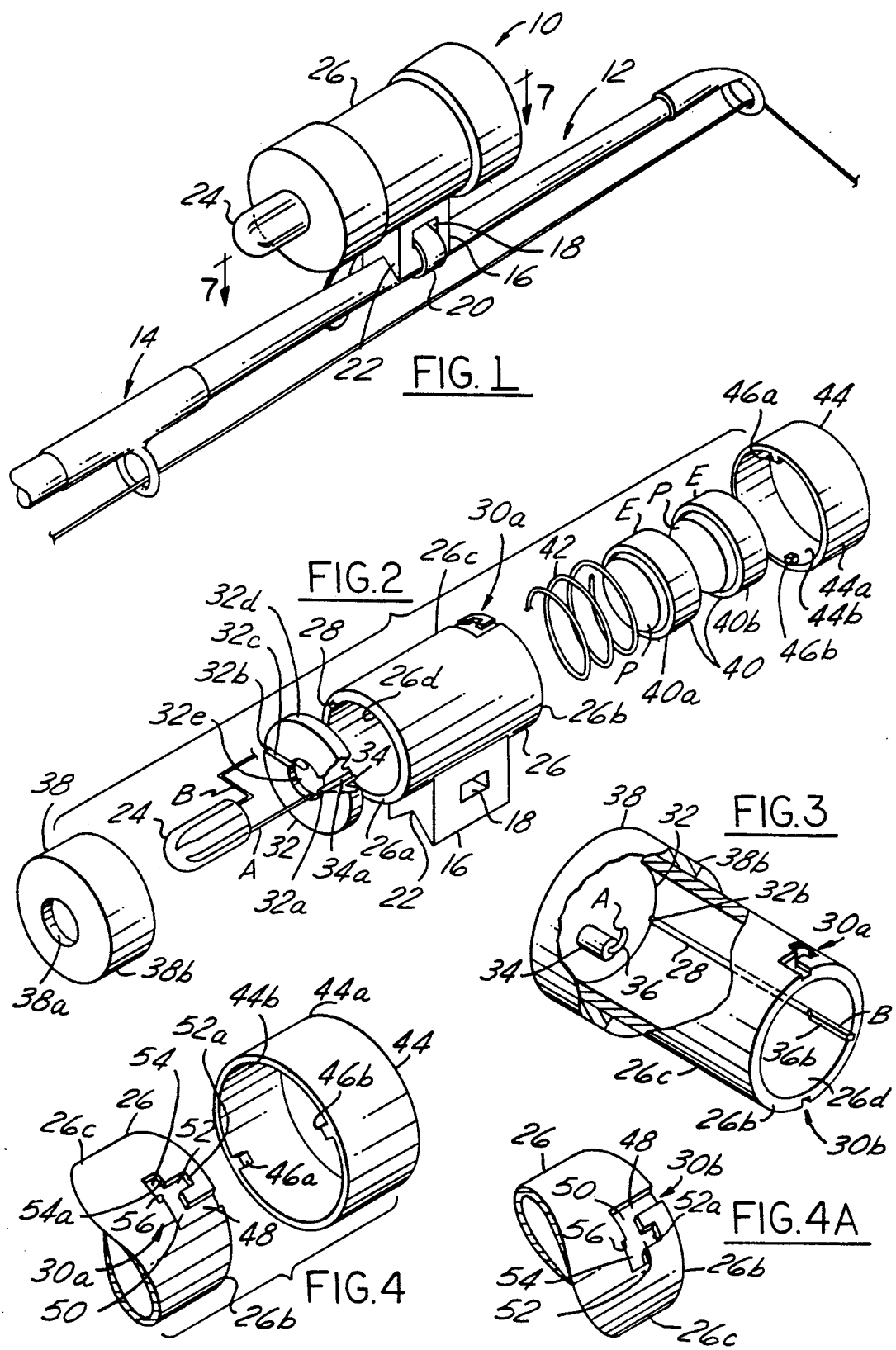

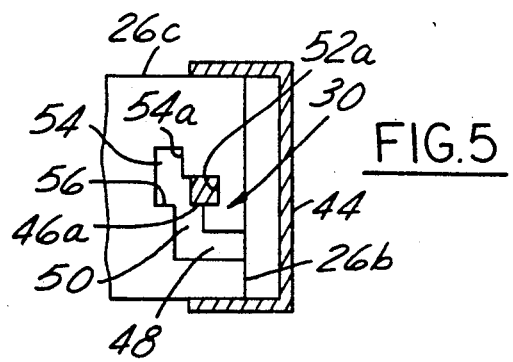
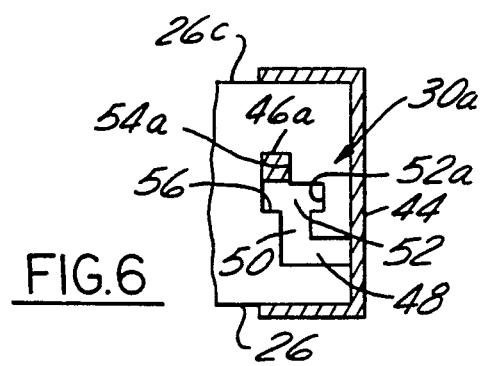
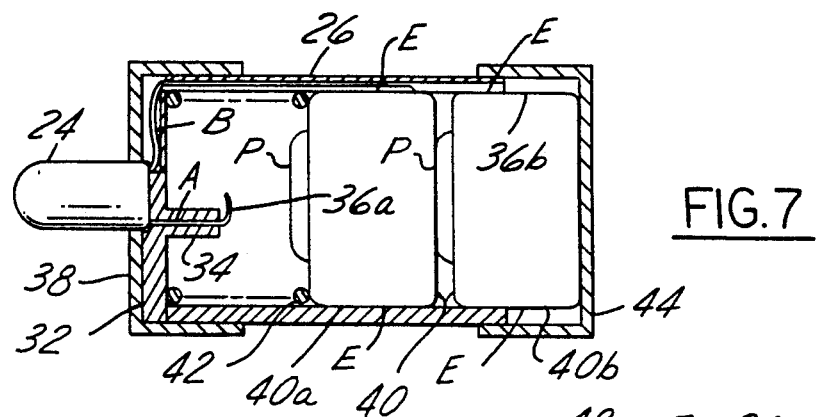
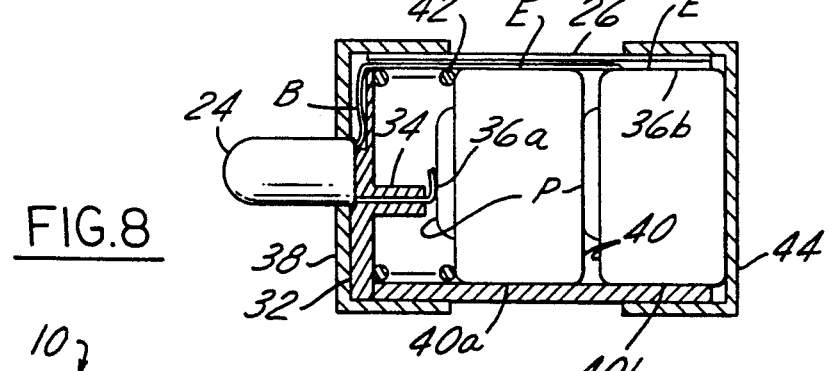
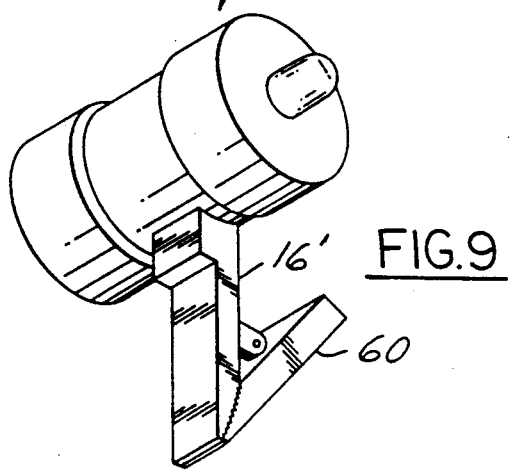
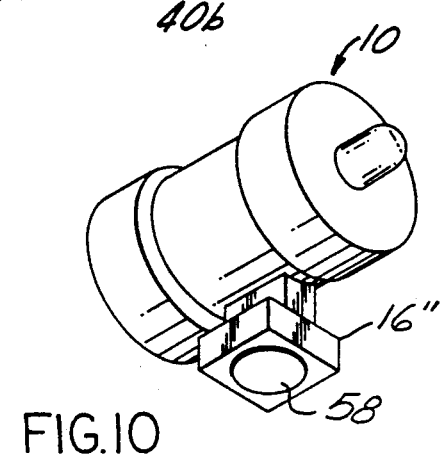

MINIATURE ELECTRICAL LIGHTING DEVICE

BACKGROUND OF THE INVENTION

1. Field of the Invention

The present invention generally relates to self-contained electrical lighting devices and more particularly to a miniature electrical lighting device which is economical and durable while at the same time compact and lightweight so as not to interfere with the normal functioning of an object to which it is attached.

2. Description of the Prior Art

Fishermen who fish in darkness are unable to see the action at the end of their fishing pole. Accordingly, they must carefully use their tactile sense in order to successfully catch striking fish. This situation would be alleviated if an illumination source could be provided at the end of their fishing pole in order to indicate pole flexing in response to a fish striking the bait.

Miniature electric light sources have been well known in the art for a long time. Most simple electric light sources contain four basic components: a housing, a light emitting device mounted with respect to the housing, batteries located within the housing, and a switch mechanism for selectively connecting the light emitting device to the batteries.

There have been attempts in the prior art to provide a compact, lightweight yet durable illumination device that is adaptably structured for being retrofitted onto a thinly cross-sectioned member, particularly fishing poles, but also related structures such as automobile antennas, as follows. U.S. Pat. No. 4,376,349 to Varczower, dated Mar. 15, 1983, discloses an electric light device having a dry cell battery, an electric switch (which may be actuated by the fishing line tension), a small light bulb and a clip for providing mounting to a fishing pole. U.S. Pat. No. 4,479,321 to Welstead, dated Oct. 30, 1984, discloses an electric light device having a light bulb with a transparent cap, a battery, a gravity actuated switch and an open sided groove for providing a snap fit attachment onto a fishing pole. U.S. Pat. No. 4,586,284 to Westwood, III, dated May 6, 1986, discloses a signalling device for connection to a fishing rod which provides sound and light emission in response to fishing line tensioning. U.S. Pat. No. 2,252,395 to Cohen, dated Aug. 12, 1941, discloses an automobile antenna having a light at its distal end, the light being connected with the car battery. U.S. Pat. No. 3,506,956 to Kolm et al, dated Apr. 14, 1970, discloses a sonically activated sound and light emitting automobile finder which is connected with the radio antenna, the light bulb thereof being located adjacent the base and the light therefrom being transmitted by a fiberglass rod. Finally, U.S. Pat. No. 4,603,333 to Carlson, dated Jul. 29, 1986, discloses a telescoping boat antenna having a light bulb located at the antenna tip.

While the forgoing devices all attempt to provide a practical electrical illumination device suitable for mounting to a thinly cross-sectioned member, none is truly durable, lightweight, compact and long lasting. Accordingly, other attempts in the prior art at providing a practical illuminator of thinly cross-sectioned members have been directed away from electrical systems to chemical systems, as exemplified by the following. U.S. Pat. No. 4,505,063 to Price et al., dated Mar. 19, 1985, discloses a housing which contains two chemiluminescent liquids which react together to emit light, the housing is connected with a fishing pole. And finally, U.S. Pat. No. 4,823,496 to Powell, dated Apr. 25, 1989, discloses a luminous clip resiliently connectable to the end eyelet of a fishing pole.

Thus, despite the need for a compact, lightweight, durable and long lasting miniature electric light device, there yet remains in the art no viable structure of this type. Consequently, what is needed is a miniature electrical lighting device which is compact, durable, lightweight and has long lasting illumination, and which is easily attachable to other objects, particularly thinly cross-sectioned members such as fishing poles, and yet is of simple design so as to be economical to manufacture.

SUMMARY OF THE INVENTION

The present invention is a compact, durable, lightweight and long lasting electrical lighting device which is economical to manufacture and able to be releasably attached to various objects, particularly thinly cross-sectioned members, without unduly burdening the object by its being connected thereto.

The miniature electrical lighting device according to the present invention is composed of a plastic cylindrical housing, a first endcap connected to one end of the housing, a light emitting member, preferably in the form of a light emitting diode (LED), which is mounted to the first endcap, one or more batteries located within the housing for powering the LED, a second endcap slidably connected with the other end of the housing so as to be rotatably and axially guided by slots on the surface of the housing adjacent thereto, a spring for biasing the second endcap away from the LED so as to effect an open circuit between the LED and the batteries, electrical leads and contacts for selectively effecting a closed circuit between the batteries and the LED when the second end cap, serving as an electrical switch, is slid axially along the slots toward the LED, and finally, an attachment member for releasably mounting the electrical lighting device to another object, such as a fishing pole.

In greater particularity, the slots on the surface of the housing interact with tabs on the adjacent inner surface of the second end cap. In this regard, there are at least two slots: a first slot which is axially aligned and axially guides the second endcap between a first position in which the circuit is open and a second position in which the circuit is closed, and a second slot communicating with the first slot and perpendicularly oriented with respect thereto guides the second endcap rotatably so as to prevent the spring from biasing the second end cap away from the second position.

Accordingly, an object of the present invention is to provide a compact and lightweight electrical lighting device.

It is an additional object of the present invention to provide a lightweight and compact electrical lighting device which is structured for being releasably connected to another object.

It is an additional object of the present invention is to provide a miniature electrical lighting device which is durable and will provide continuous illumination for an extended period of time, while at the same time is economical to manufacture.

It is a further object of the present invention to provide an electrical lighting device which is both compact and lightweight, so that its connection with respect to an object, such as for instance a fishing pole, will not impair the normal operation of the object.

It is yet another object of the present invention to provide a lightweight and compact electrical lighting device which is connectable to a fishing pole so as not to interfere with line action or casting, provide signalling of a fish strike, provide a lost fishing pole retrieval signal which is particularly useful should the fishing pole be accidentally dropped in the water, provide a long lasting, brilliant light which is visible even from a considerable distance in inclement weather, and provide a visually perceived "streak effect" which facilitates the fisherman's eye noticing movement of the fishing pole in response to a strike.

These, and additional objects, advantages, features and benefits of the present invention will become apparent from the following specification.

BRIEF DESCRIPTION OF THE DRAWINGS

FIG. 1 is a perspective view of the miniature electrical lighting device according to the present invention, shown in operation mounted with respect to a fishing pole.

FIG. 2 is an exploded perspective view of the miniature electrical lighting device according to the present invention.

FIG. 3 is a perspective, partly sectional view of the electrical lighting device according to the present invention, with the second end cap, batteries and spring removed.

FIG. 4 is a detail perspective view of the second end of the housing and the second endcap, showing the interaction between the tabs on the second end cap and the slots on the housing.

FIG. 4A is a detail perspective view of the housing showing the slots located opposite to those shown in FIG. 4.

FIG. 5 is a partly sectional side view of the miniature electrical lighting device, showing the slots on the second end of the housing cooperating with a tab on the second end cap, the second end cap being in the "OFF" or first position.

FIG. 6 is a partly sectional side view of the miniature electrical lighting device, showing the slots on the second end of the housing cooperating with a tab on the second end cap, the second end cap being in the "ON" or second position.

FIG. 7 is a partly sectional side view of the miniature electrical lighting device according to the present invention, seen along lines 7—7 in FIG. 2 in which the second end cap is in the first or "OFF" position.

FIG. 8 is a partly sectional side view of the miniature electrical lighting device according to the present invention, seen along lines 7—7 in FIG. 2 in which the second end cap in the second or "ON" position.

FIG. 9 is a perspective view of the electrical lighting device having an "alligator" clip attachment member.

FIG. 10 is a perspective view of the electrical lighting device having a magnetic attachment member.

DETAILED DESCRIPTION OF THE PREFERRED EMBODIMENT

Referring now to the Drawing, FIG. 1 depicts the miniature electrical lighting device 10 according to the present invention in operation in connection with the distal end 12 of a fishing pole 14. In this regard, the miniature electrical lighting device 10 is provided with an attachment member 16 which includes a tie 18 that passes through an aperture 20 and serves to secure the miniature electrical lighting device 10 to the fishing pole 14 by wrapping tightly about the fishing pole. Preferably the tie 18 is of the ratcheting kind commonly used for holding bundles of electrical wires or for closing trash bags. A concave surface contour 22 (shown as a "V" shape) is provided on the attachment member 16 for seatably interfacing with the fishing pole. The miniature electrical lighting device 10 provides illumination from a light emitting member 24 so that a fisherman can tell that the distal end 12 of the fishing pole 14 is vibrating (due to a strike) in dimly lit conditions. The miniature lighting device 10 advantageously provides illumination for this environment of use because of its low weight, small size and long lasting brilliance. Referring now to FIG. 2, the basic components of the miniature electrical lighting device 10 will now be detailed.

A housing 26 is provided having the shape of a cylindrical shell which is defined by a first end 26a an opposite second end 26b, an outer surface 26c and an inner surface 26d, wherein the center of rotation of the inner surface defines the cylindrical axis of the housing. Preferably, the housing 26 is constructed of a rugged, lightweight plastic material by an injection molding process. Integrally connected with the outer surface 16c of the housing 26 is the attachment member 16. A housing lead passage 28 is provided in the inner surface 26d of the housing, oriented parallel with the cylindrical axis and extending from the first end 26a to the second end 26b, a portion thereof near the second end 26b being open for an electrical contact purpose which will become clear from the description hereinbelow. On the outer surface 26c of the housing, adjacent the second end 26b, is a pair of control slot patterns 30a, 30b, the purpose of which will also become clear from the description hereinbelow.

A mounting plate 32, preferably constructed of an injection molded plastic, is provided at the first end 26a of the housing 26. The mounting plate 32 has a cross-section which substantially matches that of the outer surface 26c of the housing. A central recess 32e is provided thereon for seating of the light emitting member 24 with respect thereto. In this regard, first and second lead holes 32a and 32b are provided in the mounting plate 32 for permitting first and second electrical leads A and B, which are electrically connected with the light emitting member 24, to respectively pass therethrough. A plate lead slot 32c is provided on the mounting plate for providing a recess for the second electrical lead B to the second lead hole 32b, the second lead hole being located on the perimeter 32d of the mounting plate 32.

As can be understood from reference being additionally had to FIG. 3, the first lead hole 32a and the plate lead slot 32c are positioned so that the light emitting member 24 will be located in alignment with the cylindrical axis when the mounting plate is aligned with the first end 26a of the housing. Thus, the first electrical lead A extends straight and passes through the first lead hole 32a, while the second electrical lead B is bent at 90 degrees adjacent the light emitting member 24 so as to follow the plate lead slot 32c, then bent at 90 degrees again so as to pass through the second lead hole 32b. In this regard, the second lead hole 32b and the housing lead passage 28 are aligned so that the second electrical lead B passes from the second lead hole directly into the housing lead passage. The mounting plate 32 preferably has integrally connected thereto at the first lead hole 32a an offset member 34 having a passage 34a therethrough so that the first electrical lead A is able to pass therethrough and then be bent external thereto in order to provide a first electrical contact 36a.

The light emitting member 24 is preferably a light emitting diode (LED), but may be another light device, such as a neon bulb or an incandescent bulb; an LED is preferred because of its long life, low power requirement and brilliance.

A first endcap 38, constructed preferably of an injection molded plastic and having a central aperture 38a, is dimensioned to fit onto the housing 26 at the end 26a thereof so as to retain the mounting plate 32 in alignment with the housing, the light emitting member 24 passing through the central aperture therein. The first endcap 38 thereby serves to hold securely in place the light emitting member 24 in the central aperture with anchorage being provided by the leads A and B. The first endcap 38 may be snappingly attached via a first annular flange 38b to the housing 26, or may be permanently attached by adhesive, sonic welding, or other fastening means known in the art in the event a long service life light emitting member 24 is utilized.

One or more batteries 40 are placed within the housing 26, the cross-sectional diameter of the inside surface 26d approximating the cross-sectional diameter of the batteries 40 so that there is relatively little play therebetween. A preferred battery is the type commonly used in digital watches. The batteries ordinarily have the positive electrode P at a facing side and, electrically insulated therefrom, the sides and bottom serve as the negative electrode E. The batteries 40 are placed into the housing in series so that the positive electrode P of the first battery 40a may contact the first electrical contact 36a of the first electrical lead A. In order that the positive electrode P of the first battery 40a is normally biased away from the first electrical contact 36a, a spring 42 is positioned between the batteries 40 and the mounting plate 32. An end portion of the second electrical lead B is inset only partly into the housing lead slot 28 (the remaining portion of the second electrical lead B is inset completely within and preferably covered by the housing inside surface 26d so that it does not touch the batteries). Thus, the end portion of the second electrical lead protrudes with respect to the inside surface 26d and thereby serves as a second electrical contact 36b against which the negative electrode E of only the last battery 40b makes contact so that the batteries 40 are electrically mutually connected in series (as can be seen best in FIGS. 3, 7 and 8). This structural interrelationship provides negative contact being made with the last battery 40b and positive contact being made with the first battery 40a, thereby providing a circuit for powering the light emitting member 24. Thus, movement of the batteries 40 toward the mounting plate 32 against the biasing force of the spring 42 results in selective contact of the positive electrode P of the first battery 40a with the first electrical contact 36a (first electrical lead A) and contact of the negative electrode E of the last battery 40b with the second electrical contact 36b (second electrical lead B); accordingly, the light emitting member 24 is energized and light is emitted therefrom.

The structure to provide selective movement of the batteries 40 with respect to the mounting plate 32 will now be detailed.

A second endcap 44, preferably constructed of an injection molded plastic, is provided which is dimensioned to fit onto the second end 26b of the housing 26. In this regard, a second annular flange 44a is provided which snugly interfaces with the outside surface 26c of the housing. A pair of tabs 46a, 46b are provided on the inside surface 44b of the second annular flange 44a oppositely positioned with respect to one another. The tabs 46a, 46b are structured to guidably interface with a pair of control slot patterns 30a, 30b located on the outer surface 26c of the housing 26.

Each of the control slot patterns 30a, 30b has the following slots: a first entry slot 48 that is parallel with respect to the cylindrical axis and begins at the second end 26b of the housing, a second entry slot 50 that communicates with the first entry slot 48 and is oriented perpendicular with respect thereto, a first guide slot 52 communicating with the second entry slot 50 and oriented parallel with respect to the cylindrical axis, and finally a second guide slot 54 communicating with the first guide slot 52 and oriented perpendicular with respect thereto.

In this regard, when the second endcap 44 is placed onto the second end 26c of the housing, a respective tab 46a, 46b enters a first entry slot 48 of a respective control slot pattern 30a, 30b. The second endcap 44 is thereupon pushed onto the housing toward the first end 26a thereof against the biasing force of the spring 42 until the tabs enter respective second entry slots 50 whereupon the second endcap is rotated with respect to the housing 26 so that the tabs enter respective first guide slots 52; thereupon the spring biases the second endcap so that the tabs respectively abut the distal end 52a of each of the first guide slots 52. As can be discerned from FIGS. 5 and 7, at this first or "OFF" position of the second endcap 44, the positive electrode P of the first battery 40a does not make contact with the electrical contact 36; thus, the circuit is open and the light emitting member is not energized.

In operation, when it is desired to energize the light emitting member 24, the second end cap is axially moved toward the first end 26a of the housing, thereby compressing the spring until the positive electrode P of the first battery 40a makes good electrical connection with the first electrical contact 36a, whereat the second endcap is at the second or "ON" position, as shown in FIG. 8. Axial movement of the second endcap is guided by the tabs respectively moving guidably in the first guide slots 52. Once good electrical connection has been achieved and the light emitting member 24 is energized and emitting light, the second endcap is rotated relative to the housing, with the tabs being respectively guided by the second guide slots 54 as shown in FIG. 6. The second guide slot 54 provides an abutment surface 54a which keeps the spring from moving the batteries axially away from the first electrical contact 36a. To turn off the light emitting member, the endcap is rotated in reverse, then allowed to slide axially along the first guide slot by the urging of the spring until the tabs rest respectively against the distal end 52a of the first guide slot. In this regard, it is preferred for each of the second guide slots 54 to be displaced (toward the mounting plate) with respect to its communicating second entry slot 50 so as to provide a stop 56 which serves to prevent the tabs from accidentally entering the second entry slots when the second endcap is being rotated merely to turn off the lamp emitting member, but not to remove it from the housing.

To replace the batteries, the endcap is pushed axially toward the mounting plate until it may be rotated into the second entry slot, and then it is moved axially away from the mounting plate along the first entry slot until the second endcap is detached from the housing. Now the batteries may be replaced and the second end cap reattached as described hereinabove.

The attachment member 16 serves to provide a structure for releasably connecting the miniature electrical lighting device 10 to an object, such as a fishing pole 14, as described hereinabove. Other attachment members are possible and are within the skill of an ordinary artisan to devise. For instance, FIG. 9 shows an example of an attachment member 16' in the form of a spring loaded alligator clip 60 for providing releasable connection of the miniature electrical lighting device 10 to suitable objects, such as a person's clothing (a safety feature for joggers, bikers, and persons walking out at night). Further for instance, FIG. 10 shows an example of an attachment member 16" having a permanent magnet 58 for providing releasable connection of the miniature electrical lighting device 10 to a magnetic material.

To those skilled in the art to which this invention appertains, the above described preferred embodiment may be subject to change or modification. Such change or modification can be carried out without departing from the scope of the invention, which is intended to be limited only by the scope of the appended claims.

What is claimed is:

1. A miniature electrical lighting device for releasably connecting to an object said miniature electrical lighting device comprising:

a housing of cylindrical shell shape having a first end and an opposite second end, said housing having an outer surface and an inner surface, said inner surface defining a cylindrical axis of the housing;

a first endcap having a first annular flange structured for connecting said first endcap to said first end of said housing, said first endcap having a central aperture thereon;

a light emitting member having a first electrical lead and a second electrical lead, said light emitting member extending through said central aperture of sad first endcap;

a mounting plate located within said housing adjacent said first end thereof, said mounting plate having first electrical lead hole means through which passes said first electrical lead, said mounting plate having second electrical lead hole means through which passes said second electrical lead;

battery means located within said housing for supplying electrical energy to said light emitting member, said battery means having a positive electrode and a negative electrode;

first control slot pattern means located on said outer surface of said housing adjacent said second end thereof for providing a first plurality of guidance slots;

second control slot pattern means located on said outer surface of said housing adjacent said second end thereof and opposite said first control slot pattern means for providing a second plurality of guidance slots;

a second endcap located at said second end of said housing, said second endcap having a second annular flange, said second annular flange having an inside surface dimensioned to receive said second end of said housing;

first tab means located on said inside surface of said second annular flange for being guidably engaged by said first plurality of guidance slots of said first control slot pattern means;

second tab means located on said inside surface of said second annular flange opposite said first tab means for being guidably engaged by said second plurality of guidance slots of said second control slot pattern means;

biasing means located within said housing for biasing said battery means away from said mounting plate along said cylindrical axis;

first electrical contact means connected with said first electrical lead for providing a first electrical contact between said first electrical lead and one of said positive and negative electrodes of said battery means;

second electrical contact means connected with said second electrical lead for providing a second electrical contact between said second electrical lead and the other of said positive and negative electrodes of said battery means; and attachment means connected with said housing for releasably connecting said housing to an object;

wherein said biasing means biases said battery means and said second endcap away from said first electrical contact means, said light emitting member not being electrically connected with both said positive and negative electrodes of said battery means when said second endcap is at a first position with respect to said first end of said housing defined by said first and second control slot pattern means; wherein further, said light emitting member is electrically connected with both of said positive and negative electrodes of said battery means when said second endcap is moved guidably with respect to said first and second control slot pattern means to a second position with respect to said first end of said housing; and wherein each of said first and second plurality of guidance slots, each respectively of said first and second control slot pattern means, comprise:

a first entry slot on said outer surface of said housing oriented parallel with respect to the cylindrical axis, said first entry slot beginning at said second end of said housing;

a second entry slot on said outer surface of said housing communicating with said first entry slot, said second entry slot being oriented perpendicular with respect to said first entry slot;

a first guide slot on said outer surface of said housing communicating with said second entry slot, said first guide slot being oriented parallel with respect to the cylindrical axis, said first guide slot having a distal end; and a second guide slot on said outer surface of said housing communicating with said first guide slot, said second guide slot being oriented perpendicular with respect to said first guide slot;

wherein said second endcap is located at said second position when said first and second tabs are located respectively at said distal end of said first guide slot of each of said first and second plurality of guidance slots; wherein further, said second endcap is located at said second position when said first and second tabs are located respectively at said second guide slot of each of said first and second plurality of guidance slots.

2. The miniature electrical lighting device of claim 1, wherein said second endcap is retained at said second position when said second endcap is rotated relative to said housing so that said first and second tabs are located respectively in said second guide slot of each of said first and second plurality of guidance slots.

3. The miniature electrical lighting device of claim 2, wherein said second guide slot and said second entry slot of each of said first and second control slot pattern means is mutually offset so as to provide stop means for retaining said first and second tab means within respective said first and second guide slots when said second endcap is moved from first position to said second position and vice versa.

4. The miniature electrical lighting device of claim 3, wherein said first electrical contact means and said first electrical lead hole means comprise:
   a first electrical lead hole through said mounting plate located so that said first electrical lead of said light emitting member is able to pass therethrough while simultaneously said light emitting member passes through said central aperture of said first endcap; and
   an offset member connected with said mounting plate, said offset member having a passage communicating with said first electrical lead hole in said mounting plate;
   wherein said first electrical lead passes through said first electrical lead hole and said passage and terminates external of said passage so as to form a first electrical contact within said housing so that one of said positive and negative electrodes of said battery means makes contact therewith when said second endcap is located at said second position.

5. The miniature electrical lighting device of claim 4, wherein said second electrical lead hole means and said second electrical contact means comprise:
   a radially oriented plate lead slot in said mounting plate for receiving said second electrical lead;
   a second electrical lead hole in said mounting plate communicating with said plate lead slot, said second electrical lead hole being located peripherally with respect to said mounting plate; and
   a housing lead passage in said inner surface of said housing, said housing lead passage communicating with said second electrical lead hole, said housing lead passage having an open end portion located a preselected distance from said mounting plate;
   wherein said second electrical lead passes along said plate lead slot, through said second electrical lead hole, and through said housing lead passage so as to protrude with respect to said inner surface of said housing at said open end portion of said housing lead passage; wherein further, the other of said positive and negative electrodes of said battery means recited in claim 9 contacts said second electrical lead at said open end portion of said housing lead passage when said endcap is located at said second position.

6. The miniature electrical lighting device of claim 5, wherein said second electrical lead hole means and said second electrical contact means further comprise a central recess in said mounting plate communicating with each of said first and second electrical lead holes, said central recess being structured to seatably receive said light emitting member.

7. A miniature electrical lighting device for releasably connecting to an object, said miniature electrical lighting device comprising:
   a housing having a first end and an opposite second end;
   a first endcap having a first annular flange structured for connecting said first endcap to said first end of said housing, said first endcap having a central aperture therein;
   a light emitting member having a first electrical lead and a second electrical lead, said light emitting member extending through said central aperture of said first endcap;
   battery means located within said housing for supplying electrical energy to said light emitting member, said battery means having a positive electrode and a negative electrode;
   a mounting plate located within said housing adjacent said first end thereof, said mounting plate having first electrical lead hole means through which passes said first electrical lead, said mounting plate having second electrical lead hole means through which passes said second electrical lead;
   an endcap located at said second end of said housing, said endcap having an annular flange;
   control slot pattern and tab means located on said housing adjacent said second end thereof and on said annular flange of said endcap for providing guidance of movement of said endcap in relation to said second end of said housing;
   biasing means located within said housing for biasing said battery means away from said first end of said housing and abuttably against said endcap;
   first electrical contact means connected with said first electrical lead for providing a first electrical contact between said first electrical lead and one of said positive and negative electrodes of said battery means;
   second electrical contact means connected with said second electrical lead for providing a second electrical contact between said second electrical lead and the other of said positive and negative electrodes of said battery means; and
   attachment means connected with said housing for releasably connecting said housing to an object;
   wherein said biasing means biases said battery means and said second endcap away from said first end of said housing so as to bias said endcap to a first position with respect to said first end of said housing which is defined by said control slot pattern and tab means, said first and second electrical contact means not both being electrically connected with said battery means when said endcap is at said first position with respect to said first end of said housing; wherein further, said first and second electrical contact means are both electrically connected with said battery means when said endcap is moved guidably with respect to said control slot pattern and tab means to a second position with respect to said first end of said housing against said biasing of said biasing means; and
   wherein said first electrical lead hole means and said first electrical contact means comprise:
   a radially oriented plate lead slot in said mounting plate for receiving said first electrical lead;
   a first electrical lead hole in said mounting plate communicating with said plate lead slot, said first electrical lead hole being located peripherally with respect to said mounting plate; and
   a housing lead passage in sad inner surface of said housing, said housing lead passage communicating with said first electrical lead hole, said housing lead passage having an open end portion located a preselected distance from said mounting plate;

wherein said first electrical lead passes along said plate lead slot, through said first electrical lead hole, and through said housing lead passage so as to protrude with respect to said inner surface of said housing at said open end portion of said housing lead passage; wherein further, one of said positive and negative electrodes of said battery means contacts said first electrical lead at said open end portion of said housing lead passage when said endcap is located at said second position.

8. The miniature electrical lighting device of claim 7, wherein said second electrical contact means and said second electrical lead hole means comprise:

a second electrical lead hole through said mounting plate located so that said second electrical lead of said light emitting member is able to pass therethrough while simultaneously said light emitting member passes through said central aperture of said second endcap; and an offset member connected with said mounting plate, said offset member having a passage communicating with said second electrical lead hole in said mounting plate;

wherein said second electrical lead passes through said second electrical lead hole and said passage and terminates external of said passage so as to form a second electrical contact within said housing so that the other of said positive and negative electrodes of said battery means makes contact therewith when said second endcap is located at said second position.

9. The miniature electrical lighting device of claim 8, wherein said first electrical lead hole means and said first electrical contact means further comprise a central recess in said mounting plate communicating with each of said first and second electrical lead holes, said central recess being structured to seatably receive said light emitting member.

* * * * *